United States Patent [19]

Guyomard

[11] 4,316,939
[45] Feb. 23, 1982

[54] PROCESS FOR THE APPLICATION OF AN ANTI-CORROSIVE COATING UPON METALLIC OBJECTS, ESPECIALLY BOTTLES FOR LIQUEFIED GAS

[75] Inventor: Daniel Guyomard, Lamorlaye, France

[73] Assignee: Helic Van Cauwenberghe, Le Bourget, France

[21] Appl. No.: 135,130

[22] Filed: Mar. 28, 1980

[30] Foreign Application Priority Data

Mar. 29, 1979 [FR] France .................................. 79 07884

[51] Int. Cl.³ .............................................. B05D 1/04
[52] U.S. Cl. .................................... 428/413; 206/0.6;
206/524.3; 427/27; 427/406; 427/410; 428/416;
428/425.5; 428/425.9; 428/458
[58] Field of Search .................... 428/328, 416, 423.1,
428/425.9, 458, 413, 425.5; 427/406, 27, 410;
206/0.6, 524.3

[56] References Cited

U.S. PATENT DOCUMENTS 3,769,069 10/1973 Sawyer ............................ 428/423.1
4,229,495 10/1980 Takahashi et al. .................. 427/406

FOREIGN PATENT DOCUMENTS 2612154 1/1977 Fed. Rep. of Germany ...... 427/406
2063942 5/1977 Japan ................................... 427/410

OTHER PUBLICATIONS

Tator, "Materials Performance", Mar. 1976, pp. 9–16.

*Primary Examiner*—John H. Newsome
*Attorney, Agent, or Firm*—Scully, Scott, Murphy & Presser

[57] ABSTRACT

This invention relates to a process for applying an anti-corrosive coating upon metallic objects.

A paint containing more than 90% by weight of pulverulent zinc in relation to the dry extract is applied to the previously shot cleaned surface of the metallic object. After drying and hardening of this paint, one applies thereon, by electrostatic means, a powdered resin capable of adhering to the zinc upon polymerization and thereafter polymerization of said resin is brought about.

13 Claims, No Drawings

PROCESS FOR THE APPLICATION OF AN ANTI-CORROSIVE COATING UPON METALLIC OBJECTS, ESPECIALLY BOTTLES FOR LIQUEFIED GAS

BACKGROUND OF THE INVENTION

1. Field of the Invention

This invention relates to processes for applying anti-corrosive coatings upon metallic objects, especially upon bottles for liquefied gas.

2. Description of the Prior Art

It is known that ferrous alloy objects such as gas bottles corrode very rapidly upon contact with the ambient atmosphere, particularly when they are exposed to the elements.

To protect them, one conventionally employs a process comprising three principal steps:
  a shot or sand cleaning of the surface to be treated;
  a metallization referred to as "coating with zinc" on the cleaned surface;
  the application of at least one coat of a protective paint.

The shot cleaning operation simply seeks to mechanically clean the surface of the object to be protected with an abrasive in order to eliminate calamine and traces of rust which can be present thereon and to roughen this surface for the purpose of assisting in the adhesion of protective layers to the metal.

The metallization by zinc coating consists in projecting a molten or a zinc-aluminum alloy upon the surface to be protected. The thickness of the zinc layer is usually from 40 to 100 microns.

This metallization operation is relatively time consuming and expensive due to the nature of the metal employed, the energy expended to melt the metal and the time required for its projection. It has, therefore, already been proposed to substitute zinc metal with the application of primer paint containing a corrosion inhibiting pigment, but the corrosion resistance of a surface thus protected is notably less than that which the presence of zinc assures.

Finally, the deposition of an exterior coat of paint is customarily done twice. One starts by applying a primer coat of a thickness of 30 to 40 microns, the essential function of which is to seal the imperfections in the surface of the zinc layer which is very porous. The primer paint can be of various types: glycerophthalic, vinyl, styrenated-alkyl paints, etc., and it can be applied by pneumatic spray gun either electrostatically or by any other method. One thereafter applies upon this primer coat a finishing coat, whose purpose is to impart to the object to be treated its final appearance. There is generally used for this purpose a paint having a glycerophthalic resin and aminoplastic resin base, which is applied in the form of a coating of about 30 microns thickness and which is then dried by passage for about 30 minutes in an oven at a temperature on the order of 130°–140° C.

The aggregate of these operations known in the art is therefore time consuming and costly.

SUMMARY OF THE INVENTION

The invention herein seeks to remedy these disadvantages in proposing a process of application of an anti-corrosive coating upon metallic objects which will be simpler and less costly than the prior art processes and which nevertheless assures a protection for these objects which is at least as good as that obtained with the known processes.

To achieve this, the process according to the invention is essentially characterized in that, upon the previously shot cleaned surface of the object, a paint is applied which contains more than 90% by weight of pulverulent zinc relative to the dry extract, in that, after drying and hardening of this paint, there is applied thereupon, by an electrostatic method, a powdery resin capable of adhering to zinc when polymerized, and in that the polymerization of said resin is finally initiated.

The particles of the zinc paint will preferably possess a size between 1 and 30 microns, more generally between 1 and 8 microns.

The protective effect of zinc on objects of ferrous alloy, especially in steel, is well known in the art and one will simply recall that it is explained by the fact that zinc, more electronegative than iron, loses electrons to the benefit of steel, which is therefore protected cathodically.

It is thus through an electrochemical process that zinc protects iron from corrosion, and paints rich in zinc, that is paints containing more than 90% by weight of zinc powder in relation to the dry extract, have a protective effect at least equal to that of zinc deposited by dipping (galvanization) or by projection in the molten state (metallization by zinc coating).

DESCRIPTION OF THE PREFERRED EMBODIMENTS

Within the scope of the present invention, different types of binding agents can be employed to obtain zinc-rich paints. One can particularly cite the polyurethane resins, the epoxide resins and their esters, the alkaline-earth silicates in aqueous solution and the organic silicates, especially ethyl silicate.

In a preferred embodiment of the invention, a partially hydrolyzed ethyl silicate such as described in French Pat. No. 71.22807 (publication number 2,142,674), filed June 23, 1971, by the Van Cauwenberghe Works can be employed as the binding agent.

A coat of this paint of from 15 to 40 microns, usually from 15 to 20 microns, will generally be applied to objects which have been previously shot cleaned. The drying of the paint being very rapid, especially when hot, one will be able to bring the objects to a temperature from 30°–35° C. before proceeding to the application of the paint. For the purpose of finishing the hydrolysis of the ethyl silicate, one can advantageously submit the objects thus coated to a jet of water vapor.

The effects of such a treatment with vapor are illustrated by tests carried out by the Applicant on test-pieces of steel coated, after shot cleaning, with a coat of 15$\mu$ thickness of zinc-rich paint sold by the Applicant under the trade name Ecol-Zinc Number 6 (paint containing 92% by weight of pulverulent zinc with a binding agent of partially hydrolyzed ethyl silicate). These test-pieces are submitted to different treatments before receiving a finishing coat, by electrostatic spraying, of a coat of polyurethane powder 60–90 microns thick which is then polymerized by heating to 190° C.

In a first series of tests, before the application of the finishing coat, the coat of zinc-rich paint is dried for 15 minutes at ambient temperature, then heated in an oven.

In a second series, the coat of paint is dried for 24 hours at ambient temperature in a humid atmosphere having a relative humidity of 75%, then heated in an oven.

Finally, in a third series of tests, the test-pieces coated with the zinc-rich paint are treated for three minutes with water vapor and thereafter heated in an oven.

After 24 hours rest, traction pellets are glued to the surface of the coating, then, after polymerization of the glue, the edge of the pellet is cut off and one procedes to traction tests (Elcometer device) in order to determine the extent of adherence of the Ecol-Zinc Number 6 paint to the steel and the extent of adherence of the finishing coat to this paint layer.

The mean of the results of the traction tests on each series of test-pieces was as follows:
first series: 10 kg/cm$^2$;
second series: 15 kg/cm$^2$;
third series: 30 kg/cm$^2$.

Thus, these tests demonstrate the advantage of a treatment with vapor, after application upon the object to be protected, of a paint rich in zinc whose binding agent is made up of partially hydrolyzed ethyl silicate. For the last series of tests, one finds, moreover, after pulling off the traction pellet, the presence of zinc on the test-piece and on the back of the unglued pellet, which shows that the adherence of the paint on the steel and the finishing coat on the paint is greater than 30 kg/cm$^2$.

The powdered resin employed to provide the outer protective coat will preferably possess the following qualities:
- a good adhesion to the coat of zinc;
- a satisfactory flexibility, in view of resisting shocks;
- a good resistance to abrasion, in order to lend itself to handling and transportation operations; and,
- a good resistance to aging, upon exposure to the outside.

One can employ for this purpose epoxide resins prepared from a combination of epoxy resin (condensate of epichlorhydrin and bisphenol A) and a hardener with a base of accelerated or substituted dicyandiamide, or cyclic amines, polyanhydrides, polyisocyanates, etc. Such resins have however a mediocre resistance to the elements and a preferred form of implementation of the invention utilizes powdered polyester resins.

As a matter of fact, the tests carried out by the Applicant have proven that the best results are obtained with external layers of polyurethane composed of a polyester resin with free hydroxyl functions and a hardener of the blocked polyisocyanate type.

As saturated polyester resins, one will be able to employ resins resulting from the polycondensation of aromatic or aliphatic polyacids and of di- or tri- functional polyols. As examples of aliphatic polyacids, one can cite adipic acid, azelaic acid and sebacic acid. As examples of aromatic polyacids, one can cite the orthophthalic, isophthalic, terephthalic acids, or their esters making it possible to make transesterifications, as well as their halogenated or hydrogenated derivitives. As examples of polyols, one can mention ethylene glycol, propylene glycol, neopentylglycol, trimethylolethane, trimethylol-hexane, pentaerythritol, 1,1-isopropylidene (paraphenyleneoxy) di-ethanol or dipropanol, and, in a general manner, the polyols whose molecular weights are between 500 and 5000, but preferably between 1000 and 3000.

The hydroxyl index will preferably be between 30 and 300 and, preferably, between 30 and 100.

As it has been indicated above, crosslinking of these polyester resins can be accomplished using blocked polyisocyanates.

This type of polyester resin can equally be utilized with other hardeners: etherified melamine (essentially hexamethoxymethylmelamine) or anhydrides of acids.

Therefore, there can be utilized, with satisfying results, a combination of polyester resin with free carboxyl functions, capable of being crosslinked with the epoxy bridges of a standard epoxide resin resulting from the reaction of epichlorhydrin and bisphenol A, the polyester resin having an acid index between 20 and 150 and, preferably, between 30 and 80. Powders with a base of acrylic resin can also be utilized for this application.

After application, the finishing coat will be polymerized in an oven employing the following conditions:
temperature: 130° to 240° C., preferably 170° to 220° C.;
residence time: 20 to 40 minutes, Carboxyl-containing polyester resins can also be cross-linked with glycidyl triisocyanurate.

The thickness of the external coat can be between 40 and 80μ. One thereby obtains objects of presentation superior to that obtained by the standard system: zinc coating metallization and paint system.

It will be noted that an external protective coat obtained by application of a resin powder alone directly on the previously shot cleaned surface of the object, and polymerization of this resin, is insufficient to insure protection against the corrosion of ferrous alloy objects exposed to the elements. Only the combination of an undercoat of a zinc-rich paint (preferably silicate) and an external layer of polymerized powdered resin produces satisfying results. In fact, comparative tests carried out by the Applicant on steel gas bottles involving an external protective coating in accordance with the invention (undercoat of paint rich in zinc 20 microns thick and finishing coat of polyurethane 80 microns thick) and similar bottles having only the external coat of polyurethane of a thickness of 80 microns have demonstrated that after 5 years of exposure to the atmosphere, the former present a continuous coating having kept its cohesion to the metal and a total absence of corrosion, whereas the latter present a flaked coating, crumbling into fragments, and a highly rusted metal surface.

Finally, in relation to the usual zinc coating metallization, the process in accordance with this invention shows itself to be much less costly.

The invention is not, of course limited to the protection of gas bottles, but is applicable to all steel objects and, more generally, to ferrous alloys, such as underground tanks, metallic foot bridges, iron and steel construction works, valve-gates, and the like.

What is claimed is:

1. A process for applying an anti-corrosive coating upon a metallic object comprising:
shot cleaning the surface of the metallic object to be protected,
painting said surface with a paint containing more than about 90% by weight of pulverulent zinc in relation to the dry extract of said paint,
applying by electrostatic means a powdered resin capable of adhering to zinc when polymerized, followed by
polymerizing said powdered resin to complete said anti-corrosive coating said paint comprises a binding agent which is a partially hydrolyzed organic silicate.

2. Process according to claim 1, characterized in that the said paint comprises a binding agent made up of partially hydrolyzed ethyl silicate.

3. Process according to claim 2, characterized in that the said paint is applied as a coat 15 to 40 microns thick.

4. Process according to claim 3, characterized in that the metallic object upon which the said paint is applied is previously brought to a temperature of about 30° to 35° C.

5. Process according to claim 4, characterized in that, after application of the said paint, the latter is submitted to the action of a jet of water vapor for a sufficient duration in order to finish the hydrolysis of the ethyl silicate.

6. Process according to claim 5, characterized in that the said powdered resin is made up of a combination of an epoxy resin and a hardener.

7. Process according to claim 6, characterized in that the said powdered resin is made up of the combination of a polyester resin with free carboxyl functions and an epoxide resin, or glycidyl triisocyanurate.

8. Process according to claim 6, characterized in that the said powdered resin is made up of a crosslinked acrylic resin.

9. Process according to claim 6, characterized in that the said powdered resin is made up of a polyester resin with free hydroxyl functions and a hardener, especially of the blocked polyisocyanate type.

10. Process according to claim 9, characterized in that the coat of the said powdered resin is 40 to 80 microns thick.

11. Process according to claim 10, characterized in that, after application, the said powdered resin is polymerized by heating to a temperature of about 130° to 240° C.

12. Metallic objects having an anti-corrosive coating applied by a process according to one of claims 1 and 11.

13. A metallic object as in claim 12 which is a liquefied gas bottle.

* * * * *